United States Patent
Yamaguchi

(10) Patent No.: US 12,188,611 B2
(45) Date of Patent: Jan. 7, 2025

(54) LUBRICANT BATH STRUCTURE AND ROBOT

(71) Applicant: FANUC CORPORATION, Yamanashi (JP)

(72) Inventor: Ryou Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/567,130

(22) PCT Filed: Jun. 29, 2021

(86) PCT No.: PCT/JP2021/024499
§ 371 (c)(1),
(2) Date: Dec. 5, 2023

(87) PCT Pub. No.: WO2023/275972
PCT Pub. Date: Jan. 5, 2023

(65) Prior Publication Data
US 2024/0280216 A1    Aug. 22, 2024

(51) Int. Cl.
*F16N 19/00* (2006.01)
*B25J 17/00* (2006.01)
*B25J 19/00* (2006.01)

(52) U.S. Cl.
CPC ............ *F16N 19/003* (2013.01); *B25J 17/00* (2013.01); *B25J 19/00* (2013.01)

(58) Field of Classification Search
CPC .......... F16N 19/003; B25J 17/00; B25J 19/00
USPC .................................................. 184/6.12, 14
See application file for complete search history.

(56) References Cited

U.S. PATENT DOCUMENTS

| 6,335,580 B1* | 1/2002 | Cognigni | F16H 57/027 74/606 R |
| 8,171,822 B2* | 5/2012 | Yamamoto | F16H 57/04 475/159 |
| 8,858,380 B2* | 10/2014 | Ishizuka | F16H 57/0445 74/25 |
| 9,695,911 B2* | 7/2017 | Uchihara | F16H 57/029 |
| 11,027,421 B2* | 6/2021 | Ohtsubo | B25J 19/0062 |

(Continued)

FOREIGN PATENT DOCUMENTS

| JP | H04128138 U | 11/1992 |
| JP | 2002295646 A | 10/2002 |

(Continued)

*Primary Examiner* — Henry Y Liu
(74) *Attorney, Agent, or Firm* — Maier & Maier, PLLC

(57) ABSTRACT

A lubricant bath structure includes a casing for storing a liquid lubricant, where: the casing is provided with a supply hole, a discharge hole, a part attachment hole, and a liquid level check hole that penetrate from inside to outside of the casing; the supply hole enables injecting the lubricant into the casing; the discharge hole enables discharging the lubricant in the casing; the part attachment hole is opened/closed by detaching/attaching a mechanism part that is to be detachably attached to an outside surface of the casing; and the liquid level check hole can be arranged at a position coincident with or lower than a lower edge of the part attachment hole, but higher than the discharge hole, and, during the discharge of the lubricant, it is possible to confirm that a liquid level of the lubricant has reached below the lower edge of the part attachment hole.

8 Claims, 6 Drawing Sheets

(56) References Cited

U.S. PATENT DOCUMENTS

| | | | |
|---|---|---|---|
| 11,148,280 B2* | 10/2021 | Kume | F16H 57/0486 |
| 11,358,289 B2* | 6/2022 | Uemura | B25J 19/0062 |
| 11,420,343 B2* | 8/2022 | Yamamoto | B25J 19/0066 |
| 11,548,141 B2* | 1/2023 | Guo | B25J 17/00 |
| 2005/0133305 A1* | 6/2005 | Okada | F16N 31/00 |
| | | | 184/65 |
| 2006/0049159 A1* | 3/2006 | Nihei | B25J 9/0018 |
| | | | 219/136 |
| 2009/0050411 A1* | 2/2009 | Ellqvist | C10M 107/34 |
| | | | 184/6.12 |
| 2019/0054614 A1* | 2/2019 | Ohtsubo | B25J 19/0062 |
| 2019/0329429 A1* | 10/2019 | Yamamoto | B25J 19/0062 |
| 2020/0238503 A1* | 7/2020 | Kume | F16H 57/029 |
| 2021/0122031 A1* | 4/2021 | Guo | B25J 9/0009 |
| 2021/0162611 A1* | 6/2021 | Uemura | B25J 19/0054 |

FOREIGN PATENT DOCUMENTS

| | | |
|---|---|---|
| JP | 2005177914 A | 7/2005 |
| JP | 2007232003 A | 9/2007 |
| JP | 2013170822 A | 9/2013 |
| JP | 2013231465 A | 11/2013 |
| JP | 2014165929 A | 9/2014 |
| JP | 2019034383 A | 3/2019 |
| JP | 2019113016 A | 7/2019 |
| JP | 2019183914 A | 10/2019 |
| JP | 2019188575 A | 10/2019 |
| JP | 2020116716 A | 8/2020 |
| JP | 2020121350 A | 8/2020 |
| JP | 2021065968 A | 4/2021 |
| JP | 2021088017 A | 6/2021 |

* cited by examiner

LUBRICANT BATH STRUCTURE AND ROBOT

TECHNICAL FIELD

The present disclosure relates to a lubricant bath structure and a robot.

BACKGROUND

There is a known articulated robot including a casing that houses a reducer and a lubricant for lubricating the reducer in a sealed state (see Japanese Unexamined Patent Application, Publication No. 2020-116716, for example).

A servomotor is attached to an outer surface of this casing, and the output shaft of the servomotor penetrates through a hole formed in the casing and is inserted into the casing. An input gear is fixed to the output shaft of the servomotor, and this input gear meshes with the gear of the reducer in the casing.

In addition, a supply hole for injecting a lubricant to the inside and a discharge hole for discharging the lubricant inside to the outside are respectively formed in upper and lower ends of the casing.

SUMMARY

According to one aspect of the present disclosure, there is provided a lubricant bath structure including a casing in which a liquid lubricant can be stored, in which the casing is provided with a supply hole, a discharge hole, a part attachment hole, and a liquid level check hole that penetrate from inside to outside of the casing, wherein the supply hole enables injecting the lubricant into the casing, the discharge hole enables discharging the lubricant in the casing, the part attachment hole is opened/closed by detaching/attaching a mechanism part that is to be detachably attached to an outside surface of the casing, and the liquid level check hole can be arranged at a position coincident with or lower than a lower edge of the part attachment hole, but higher than the discharge hole, and, during discharge of the lubricant, it is possible to confirm that a liquid level of the lubricant has reached below the lower edge of the part attachment hole.

DETAILED DESCRIPTION OF EMBODIMENTS

A lubricant bath structure 1 and a robot 100 according to a first embodiment of the present disclosure will now be described with reference to the drawings.

Figure 1:
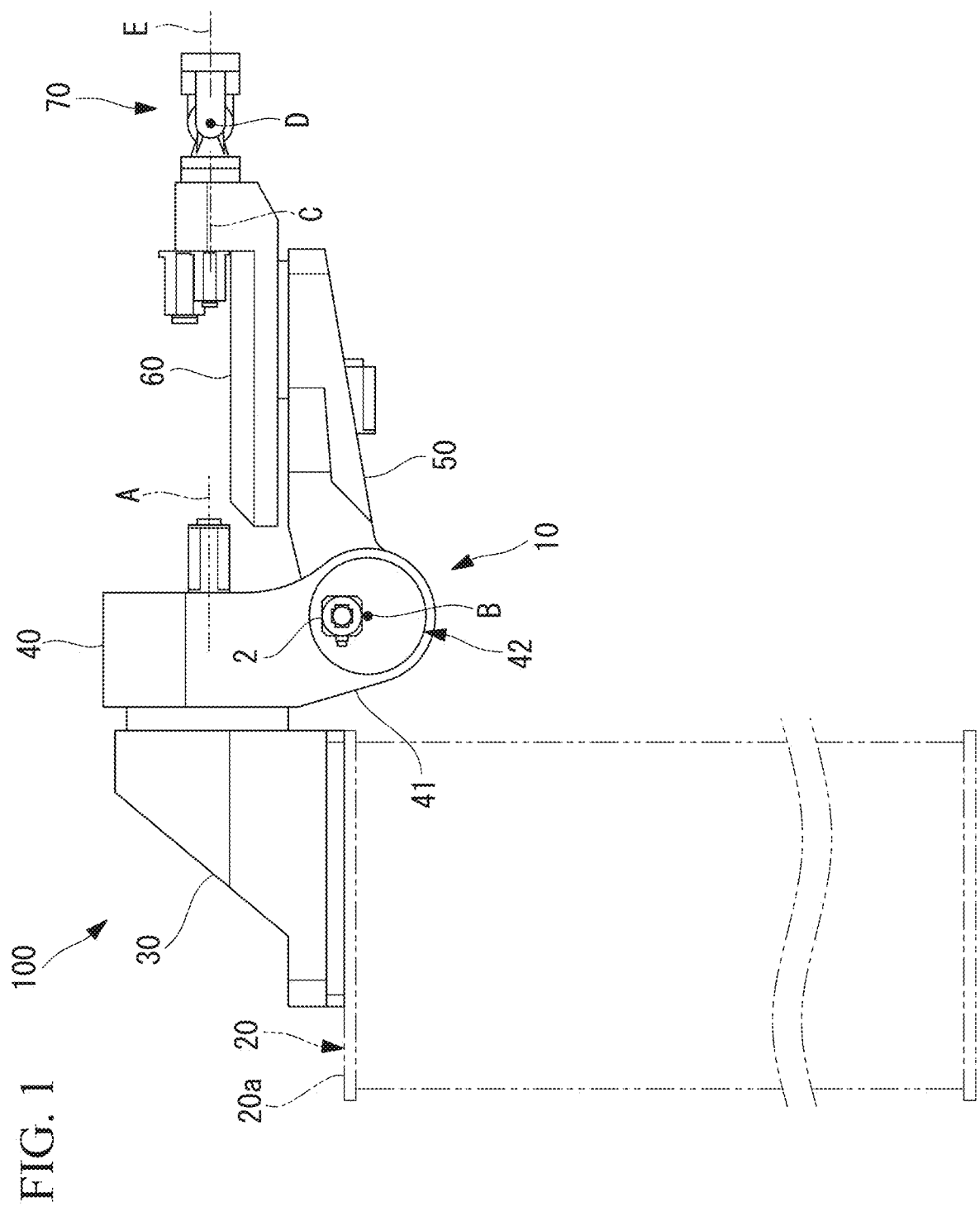
FIG. 1 is a side view of a robot according to a first embodiment of the present disclosure.

As illustrated in FIG. 1, for example, the robot 100 of this embodiment is a 6-axis articulated robot.

The robot 100 includes a base 30 fixed to a horizontal placement surface 20a of a support table 20 installed onto a horizontal floor, and a swing barrel (casing) 40 supported by one side surface of the base 30 so as to be rotatable about a horizontal first axis A. The robot 100 includes a first arm (arm member) 50 that is supported so as to be rotatable with respect to the swing barrel 40 about a second axis (axis) B that lies in a flat plane orthogonal to the first axis A. The robot 100 also includes a second arm 60 supported so as to be linearly movable in the longitudinal direction of the first arm 50, and a 3-axis wrist unit 70 disposed at a tip of the second arm 60.

A lubricant bath structure 1 of this embodiment is provided in, for example, a joint mechanism 10 between the swing barrel 40 and the first arm 50.

Figure 2:
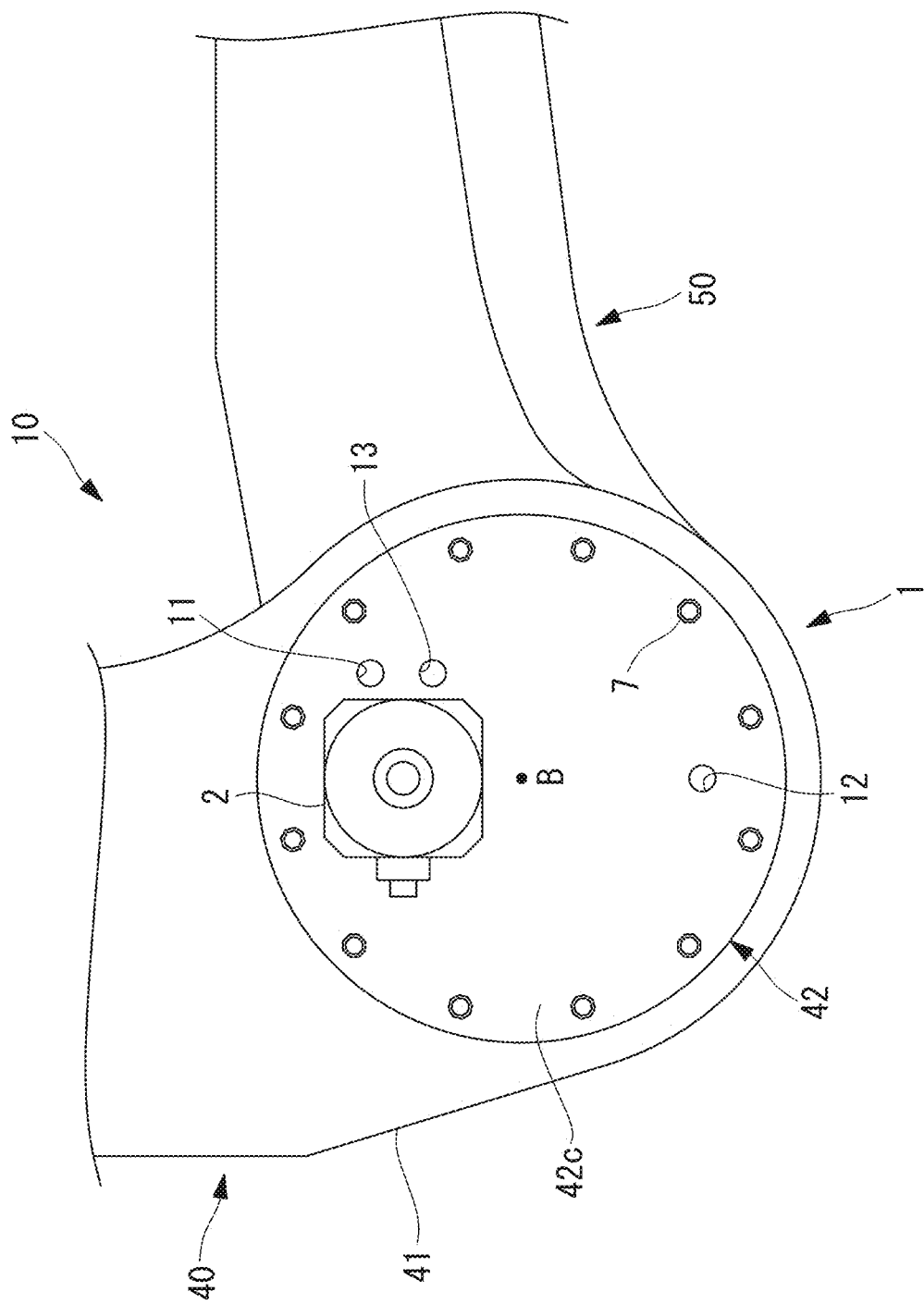
FIG. 2 is a partial enlarged view of a lubricant bath structure of the robot illustrated in FIG. 1.
Figure 3:
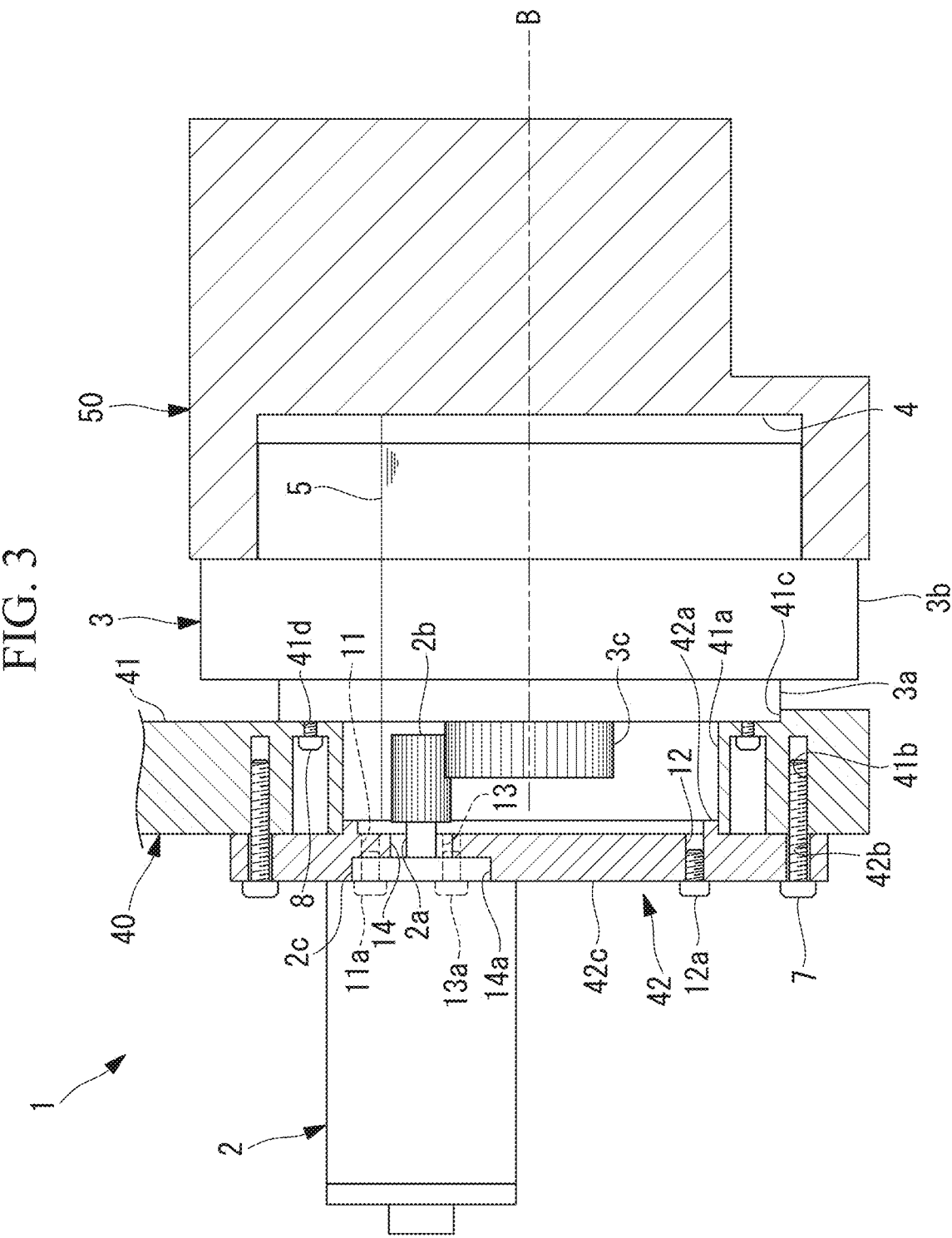
FIG. 3 is a vertical sectional view of the lubricant bath structure of the robot illustrated in FIG. 1.

As illustrated in FIGS. 2 and 3, the joint mechanism 10 includes a servomotor (mechanism part) 2 that drives the first arm 50 to rotate about the second axis B with respect to the swing barrel 40, and a reducer 3.

The swing barrel 40 includes a bracket (casing body) 41 constituting one part of the swing barrel 40, and a lid member (casing) 42 detachably attached to the bracket 41. The bracket 41 has a hollow part 41a that penetrates in the direction along the second axis B and that has a circular cross sectional shape, the lid member 42 is attached to one end side of the hollow part 41a in the second axis B direction, and the reducer 3 is attached to the other end side.

Multiple screw holes 41b equally spaced from one another in the circumferential direction are formed in the outer periphery of the hollow part 41a on one end side of the bracket 41.

The lid member 42 is formed into a circulate plate shape that can close the one end side of the hollow part 41a, and has a fitting part 42a that fits into the hollow part 41a, and multiple through holes 42b that can be arranged at positions coincident with the screw holes 41b in the bracket 41 when the fitting part 42a is fitted into the hollow part 41a.

In a state where the fitting part 42a is fitted into the hollow part 41a, bolts 7 penetrating through the through holes 42b are fastened into the screw holes 41b, and, as a result, the lid member 42 can be fixed to the bracket 41 in a positioned state, and one end side of the hollow part 41a can be closed. A seal member (not illustrated) such as an O ring is disposed between the lid member 42 and the bracket 41 to provide a tight seal.

In a state where all bolts 7 are removed, the lid member 42 can rotate about the second axis B with respect to the bracket 41. According to this feature, the angle at which the lid member 42 is installed with respect to the bracket 41 can be adjusted in increments of the angle between the screw holes 41b adjacent in the circumferential direction of the bracket 41, for example, 30°, in the example illustrated in FIG. 2. Moreover, the lid member 42 can be easily detached from the bracket 41 by removing all of the bolts 7.

The bracket 41 has a fitting part 41c into which a fixing part 3a of the reducer 3 is fitted, and through holes 41d through which bolts 8 that fix the fixing part 3a of the reducer 3 onto the bracket 41 penetrate. The space between the fixing part 3a of the reducer 3 and the bracket 41 is also tightly sealed with a seal member (not illustrated) such as an O ring. An output part 3b of the reducer 3 is fixed to the first arm 50. The space between the output part 3b and the first arm 50 is also tightly sealed with a seal member (not illustrated) such as an O ring.

The reducer 3 includes a center gear 3c supported so as to be rotatable about the second axis B. The reducer 3 reduces the rotation of a shaft (motor shaft) 2a of the servomotor 2, transmits the rotation to the first arm 50, and drives the first arm 50 to rotate about the second axis B with respect to the swing barrel 40.

The lid member 42 has a supply hole 11, a discharge hole 12, a liquid level check hole 13, and a part attachment hole 14 that penetrate through in the thickness direction.

The supply hole 11, the discharge hole 12, and the liquid level check hole 13 each have a bore sufficiently smaller than the part attachment hole 14.

The supply hole 11 is a hole for injecting a lubricant 5 into a lubrication space 4 described below, the discharge hole 12 is a hole for discharging the lubricant 5 in the lubrication space 4 to outside, and the part attachment hole 14 is a hole for attaching the servomotor 2. The liquid level check hole 13 is a hole for checking the liquid level of the lubricant 5 in the lubrication space 4 when detaching the servomotor 2 from the part attachment hole 14.

The supply hole 11 and the discharge hole 12 have female screws formed in their inner peripheral surfaces, and can be opened and closed by respective plugs 11a and 12a that are detachably fastened to the female screws. In the same manner, the liquid level check hole 13 also has a female screw formed in its inner peripheral surface, and can be opened and closed by a plug (stopper) 13a detachably fastened to the female screw.

The part attachment hole 14 has a recess 14a into which a spigot joint portion 2c of the servomotor 2 is fitted, and this recess 14a is formed in the outer periphery of an end portion (outside surface) 42c that will be situated on the outer side when the lid member 42 is attached to the bracket 41. The part attachment hole 14 has an inner diameter at least sufficient for inserting the input gear 2b fixed to the shaft 2a of the servomotor 2. The space between the servomotor 2 and the lid member 42 is also tightly sealed with a seal member (not illustrated) such as an O ring.

As illustrated in FIG. 3, in the lubricant bath structure 1, the lid member 42 is fixed to one end side of the hollow part 41a of the bracket 41, the servomotor 2 is attached to the part attachment hole 14, and the supply hole 11, the discharge hole 12, and the liquid level check hole 13 are closed by the plugs 11a, 12a, and 13a. In this manner, the lubrication space 4 tightly sealed by being surrounded by the lid member 42, the bracket 41, the reducer 3, and the first arm 50 is formed.

The lubrication space 4 stores a required amount of the liquid lubricant 5, such as oil, for lubricating the mechanism parts of the reducer 3 including the input gear 2b and the center gear 3c.

Figure 4:
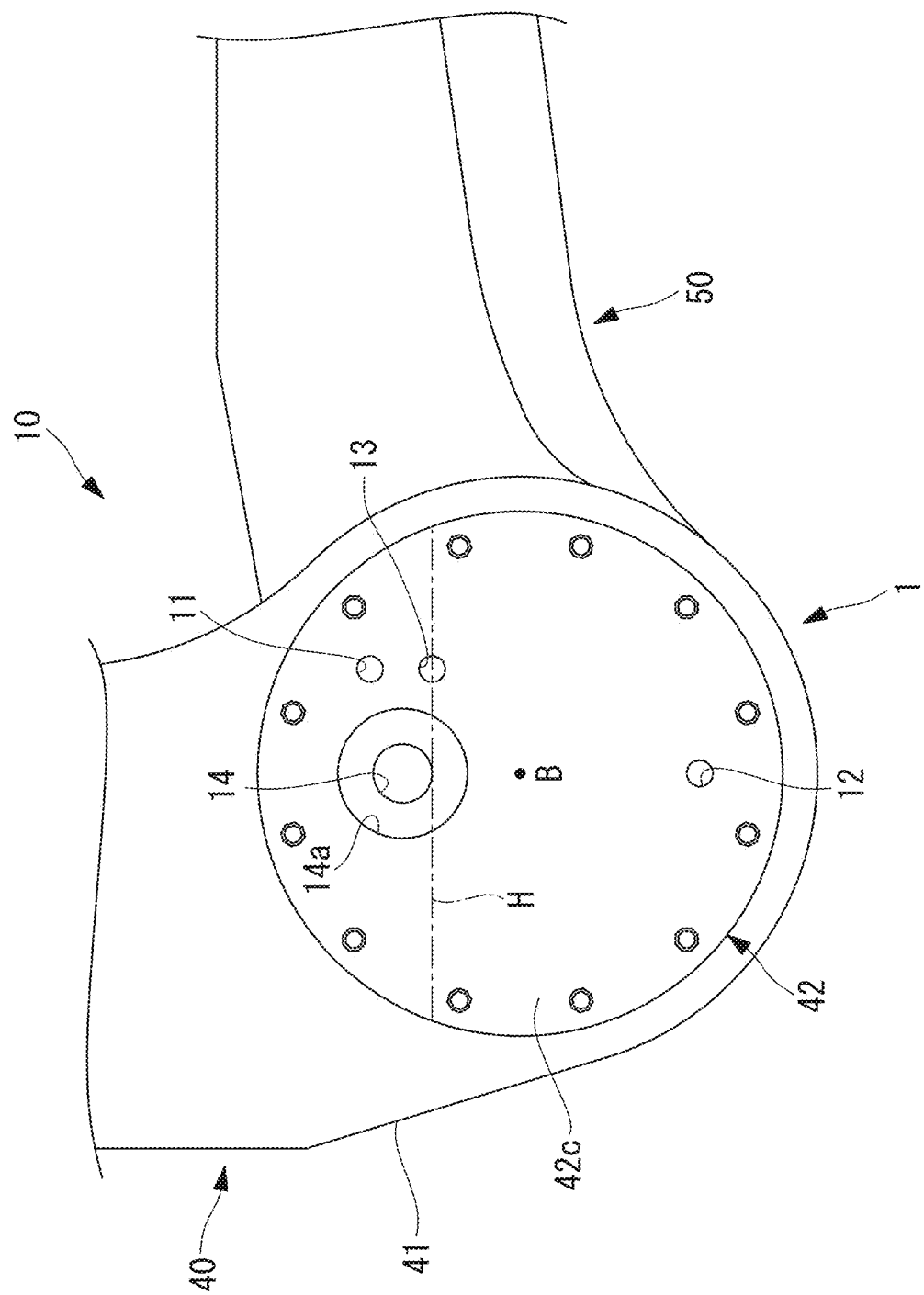
FIG. 4 is a partial enlarged view of the lubricant bath structure with a servomotor detached from a joint mechanism of the robot illustrated in FIG. 1.

As illustrated in FIG. 4, in a state where the second axis B lies horizontally, the lid member 42 is fixed to the bracket 41 at such an attachment angle about the second axis B that the part attachment hole 14 is situated above the second axis B. Here, the supply hole 11 is situated above the liquid level of the required amount of lubricant 5 stored in the lubrication space 4. Furthermore, in this state, the discharge hole 12 is arranged in the vicinity of the bottom of the lubrication space 4, and the liquid level check hole 13 is arranged at a position coincident with or lower than the lower edge of the part attachment hole 14 and higher than the discharge hole 12.

Here, that the liquid level check hole 13 is at a position coincident with or lower than the lower edge of the part attachment hole 14 means that, as illustrated in FIG. 4, in a state where the second axis B lies horizontally, the liquid level check hole 13 is arranged at a position at which a horizontal line H in contact with the lowest edge of the part attachment hole 14 contacts the lowest edge of the liquid level check hole 13, or at a position lower than this position.

The operation of the lubricant bath structure 1 and the robot 100 according to this embodiment having the aforementioned features will now be described.

When maintenance operation of the servomotor 2 of the robot 100 of this embodiment is to be conducted, first, the swing barrel 40 of the robot 100 is rotated about the first axis A with respect to the base 30 so that, as illustrated in FIG. 1, the swing barrel 40 assumes a posture with which the second axis B is horizontal. In addition, the first arm 50 is pressed against a stopper (not illustrated) to assume a posture with which the first arm 50 does not fall off by detaching the servomotor 2, or is suspended by using a crane or the like.

Next, before detaching the servomotor 2 from the lid member 42, the plugs 11a and 13a fastened to the supply hole 11 and the liquid level check hole 13 are unfastened. In such a case, since the supply hole 11 is arranged above the liquid level of the lubricant 5 in the lubrication space 4, the supply hole 11 functions as a vent hole that takes outside air into the lubrication space 4 once the plug 11a is unfastened.

When the plugs 11a and 13a are unfastened, the outside air is taken into the lubrication space 4 through the supply hole 11, and the lubricant 5 in the lubrication space 4 is gravitationally discharged to outside through the liquid level check hole 13. When the liquid level of the lubricant 5 in the lubrication space 4 reaches the height position of the lower edge of the liquid level check hole 13, discharge of the lubricant 5 through the liquid level check hole 13 stops. As a result, the liquid level of the lubricant 5 in the lubrication space 4 is coincident with or lower than the lower edge of the part attachment hole 14.

In other words, an operator can easily check that the liquid level of the lubricant 5 in the lubrication space 4 has reached the lower edge of the part attachment hole 14 or a position lower than the lower edge by confirming whether discharge of the lubricant 5 through the liquid level check hole 13 has stopped. In addition, since the liquid level check hole 13 has a diameter sufficiently smaller than that of the part attachment hole 14, the lubricant 5 can be prevented from flowing out all at once.

Subsequently, the operator detaches the servomotor 2 to be maintained from the lid member 42.

Detaching the servomotor 2 leaves the part attachment hole 14 open; however, since the lubricant 5 in the lubrication space 4 is at the lower edge of the part attachment hole 14 or at a position lower than this, the lubricant 5 is prevented from flowing out through the part attachment hole 14.

Next, a repaired servomotor 2 or a new servomotor 2 is attached to the lid member 42 to close the part attachment hole 14. In addition, the plug 13a is fastened into the liquid level check hole 13 to close the liquid level check hole 13. A nipple for supplying oil is attached to the supply hole 11, and the lubricant 5 is charged into the lubrication space 4 by using an oil supply device such as an oil gun until the liquid level of the required amount is reached. This completes the maintenance operation of the servomotor 2. The amount of the lubricant 5 required for the liquid level to reach the liquid level of the required amount from the state where the liquid level is at the position of the liquid level check hole 13 is predetermined, and thus the lubricant 5 can be accurately charged until the liquid level of the required amount is reached by administering the supply amount through the supply hole.

As such, according to this embodiment, prior to detaching the servomotor 2, the lubricant 5 is discharged through the liquid level check hole 13, and thus, the liquid level of the lubricant 5 in the lubrication space 4 can be reliably arranged to come at the lower edge of the part attachment hole 14 or a position lower than this. As a result, when the servomotor 2 is detached from the part attachment hole 14, the lubricant 5 in the lubrication space 4 can be prevented from vigorously jetting out through the part attachment hole 14 to the outside. In particular, in the case of a large robot, the capacity of the lubrication space 4 is large, and thus it is effective to suppress the amount of discharge of the lubricant 5 for the maintenance. This not only reduces the amount of the lubricant 5 discarded but also dramatically shortens the time required for the maintenance operation by shortening the time required for discharging and charging.

Instead of discharging the lubricant 5 through the liquid level check hole 13, the lubricant 5 can be discharged through the discharge hole 12. However, the amount of discharge increases if all of the lubricant 5 in the lubrication space 4 is to be discharged through the discharge hole 12. Moreover, although it is possible to reduce the amount of discharge by interrupting the discharge through the discharge hole 12, the liquid level of the lubricant 5 can only be an estimate in such a case, and it is difficult to minimize the amount of discharge.

Accordingly, this embodiment provides an advantage in that the amount of lubricant 5 discharged for the maintenance of the servomotor 2 can be reliably kept to a requisite minimum, thereby shortening the time required to discharge and charge the lubricant 5, and that the operation efficiency of the maintenance operation can be improved.

Furthermore, according to this embodiment, after the plug 13a that has been closing the liquid level check hole 13 is unfastened, the liquid level can be left unattended until discharge of the lubricant 5 through the liquid level check hole 13 stops. In other words, the operator does not have to monitor the liquid level during discharge of the lubricant 5 and can attend to other tasks during the stand-by time while still preventing excessive discharge of the lubricant 5. As a result, the operation efficiency can be improved.

In this embodiment, in a state where the second axis B is arranged horizontally, the part attachment hole 14 is arranged to be above the second axis B so that the part attachment hole 14 can be arranged at a position as close to the liquid level of the required amount of the lubricant 5 as possible. This offers an advantage in that the amount of the lubricant 5 discharged from the lubrication space 4 for maintenance of the servomotor 2 can be further reduced.

In this embodiment, as described above, the cross-sectional shape of the hollow part 41a is circular, and the screw holes 41b and the through holes 42b are formed in the bracket 41 and the lid member 42 so that the holes are spaced by 30° in the circumferential direction about the second axis B. As a result, the attachment angle of the lid member 42 can be adjusted in increments of 30° about the second axis B.

Figure 5:
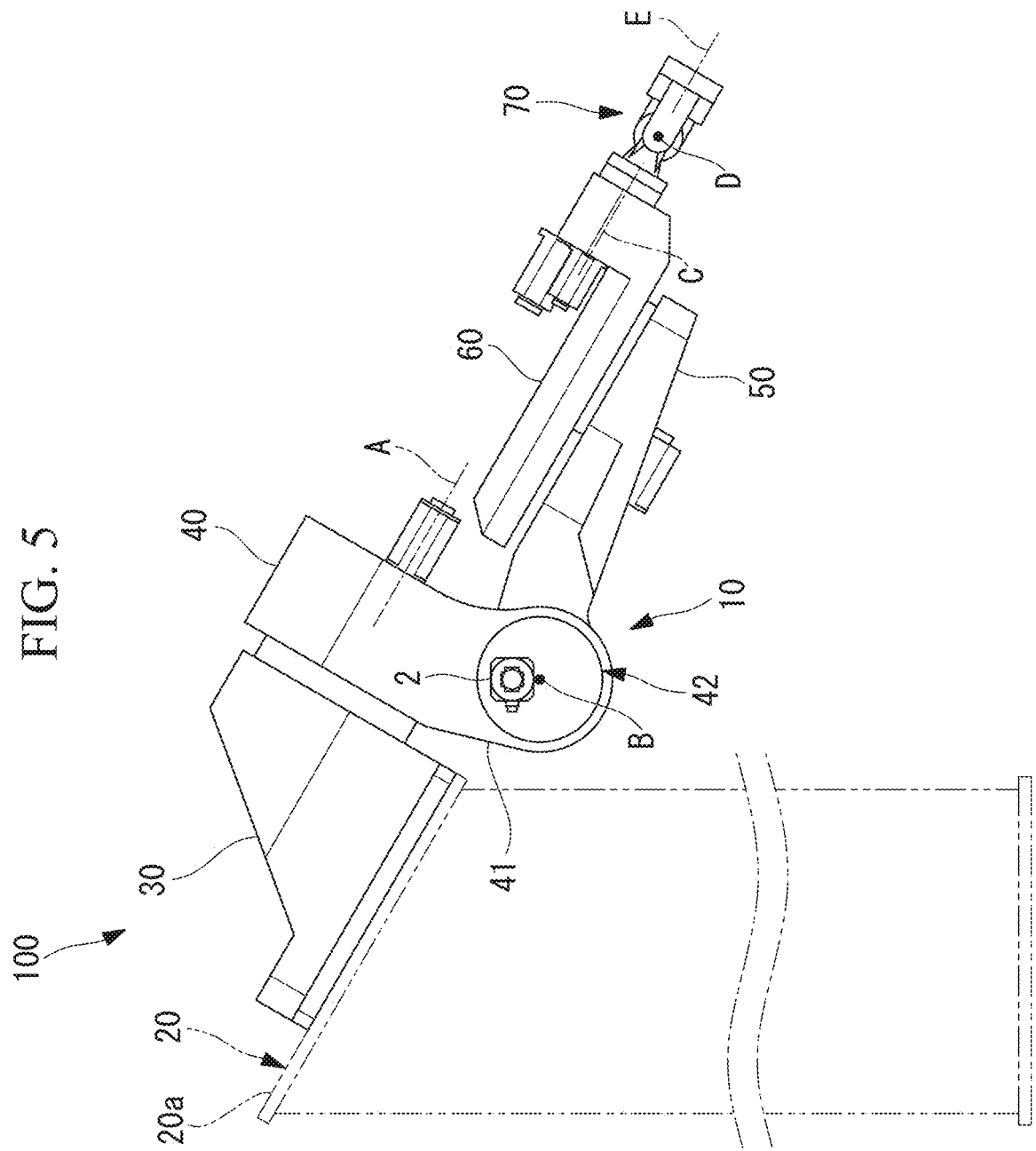
FIG. 5 is a side view illustrating a state where the robot illustrated in FIG. 1 is installed on a surface sloping with respect to a horizontal floor.

For example, as illustrated in FIG. 5, when the placement surface 20a of the support table 20 where the robot 100 is placed is sloping 30° with respect to the horizontal direction, the attachment angle of the lid member 42 to the bracket 41 can be adjusted such that the discharge hole 12 is at the lowest position. In other words, even when the angle of the placement surface 20a of the support table 20 is changed, the relative positional relationship in the gravitational direction among the supply hole 11, the discharge hole 12, the liquid level check hole 13, and the part attachment hole 14 formed in the lid member 42 can be maintained.

The intervals of the screw holes 41b and the through holes 42b are not limited to 30° and may be any desired angle. The attachment position can be more finely adjusted by forming the screw holes 41b and the through holes 42b with smaller interval angles. Moreover, the through holes 42b may be formed as arc-shaped long holes extending in the circumferential direction about the second axis B so that the attachment position can be adjusted steplessly.

Moreover, in this embodiment, an example in which there is a single part attachment hole 14 used to attach one servomotor 2 is described; alternatively, there may be multiple part attachment holes 14 and multiple servomotors 2.

In such a case, one liquid level check hole 13 may be provided for each part attachment hole 14, or, when the lower edges of the part attachment holes 14 are at the same position, a common liquid level check hole 13 may be provided for the multiple part attachment holes 14.

In this manner, when conducting maintenance of any one of servomotors 2, the lubricant 5 can be discharged by utilizing the liquid level check hole 13 arranged at the height position of the lower edge of the part attachment hole 14 corresponding to the servomotor 2 to be maintained.

In other words, when the joint mechanism 10 includes multiple part attachment holes 14 and multiple servomotors 2, the amount of the lubricant 5 discharged for the maintenance operation of the servomotor 2 can be reduced to the requisite minimum depending on the servomotor 2 to be maintained.

In this embodiment, the servomotor 2 is described as an example of the mechanism part that opens and closes the part attachment hole 14 by being attached or detached; however, the mechanism part is not limited thereto. For example, the mechanism part may be any desired mechanism part that can be detachably attached to the lid member 42, such as an oil temperature sensor, an oil pressure sensor, or an oil filter.

Although an example in which the lubricant bath structure 1 is provided in the joint mechanism 10 between the swing barrel 40 and the first arm 50 of the robot 100 is described, the lubricant bath structure 1 is not limited thereto and may be applied to a joint mechanism at any desired position, for example.

Moreover, in this embodiment, a 6-axis articulated robot is described as an example of the robot 100; however, the robot is not limited thereto and may be any robot that has at least one joint mechanism. Furthermore, the lubricant bath structure 1 may be employed in any device other than a robot.

Furthermore, an example in which the supply hole 11, the discharge hole 12, the liquid level check hole 13, and the part attachment hole 14 are all formed in the lid member 42 that forms the lubrication space 4, and in which the lid member 42 is fixed to the bracket 41 of the swing barrel 40 has been described. According to this, the lid member 42 is maintained at the same position even when the first arm 50 is actuated, and thus, for maintenance of the servomotor 2, it is only necessary to have the second axis B arranged horizontally to prevent falling of the first arm 50.

Alternatively, at least one of the supply hole 11, the discharge hole 12, the liquid level check hole 13, and the part attachment hole 14 may be formed in some other member that constitutes the lubrication space 4, for example, the reducer 3 or the first arm 50.

Next, a lubricant bath structure 1' and a robot 100' according to a second embodiment of the present disclosure are described with reference to the drawings.

In the description of this embodiment, the features that are common to the lubricant bath structure 1 and the robot 100 of the first embodiment described above are denoted by the same reference signs and the descriptions therefor are omitted.

Figure 6:
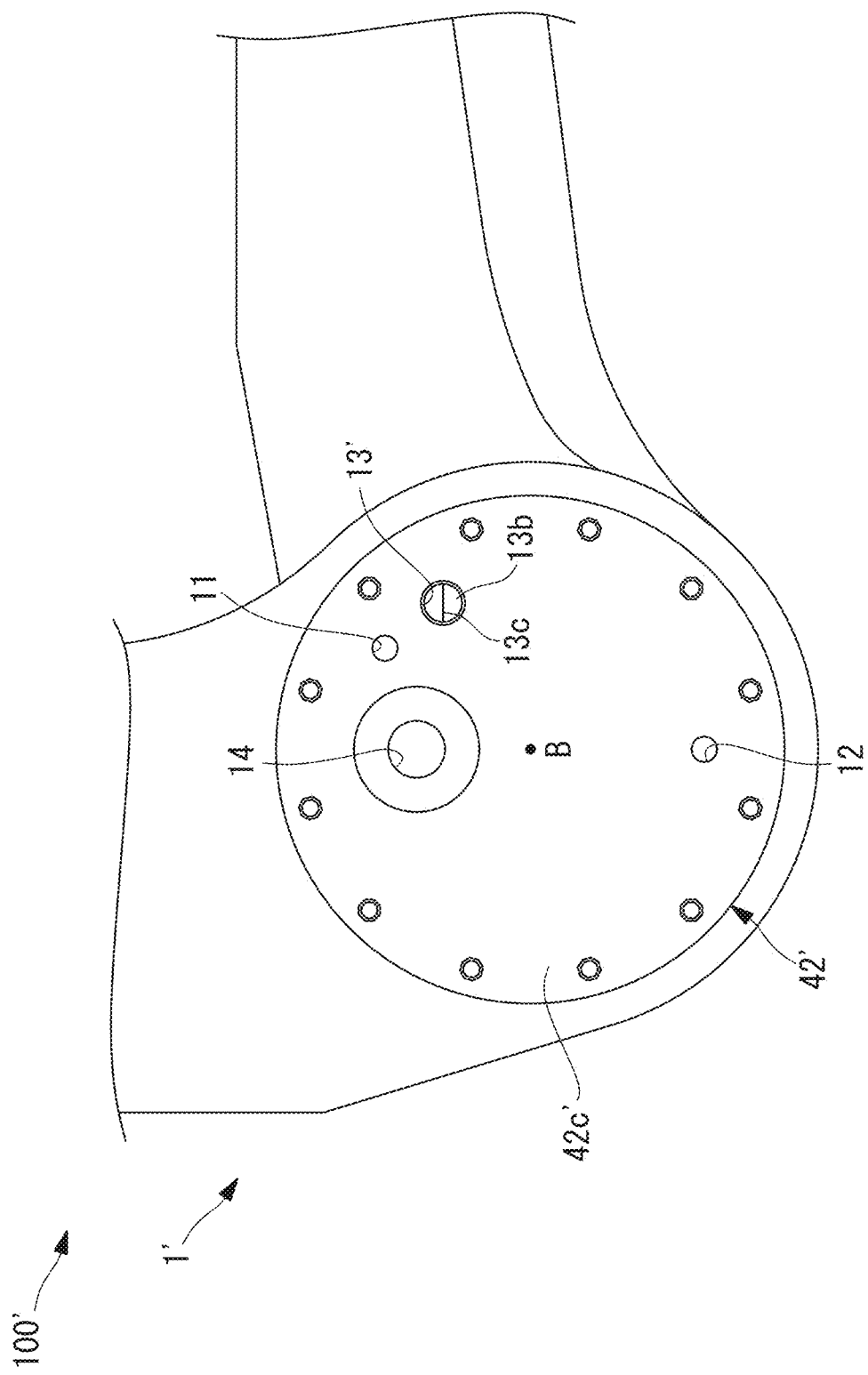
FIG. 6 is a partial enlarged view of the lubricant bath structure with a servomotor removed from a joint mechanism of a robot according to a second embodiment of the present disclosure.

As illustrated in FIG. 6, a lid member 42' of the lubricant bath structure 1' of this embodiment has a liquid level check hole 13' that is closed by a window member 13b formed of an optically transparent resin, glass, or the like instead of a liquid level check hole 13' that can be opened and closed with the plug 13a.

The window member 13b is fixed in the liquid level check hole 13' in a state where the space between the window member 13b and the inner surface of the liquid level check hole 13' is tightly sealed with rubber or an adhesive. Moreover, the window member 13b includes a mark (indicator) 13c at a position coincident with the height of the lower edge of the part attachment hole 14.

According to the lubricant bath structure 1' and the robot 100' of this embodiment having such features, before detaching the servomotor 2 from the lid member 42', the plugs 11a and 12a are removed from the supply hole 11 and the discharge hole 12 to open the supply hole 11 and the discharge hole 12. As a result, while the outside air is taken into the lubrication space 4 through the supply hole 11, the lubricant 5 in the lubrication space 4 is gravitationally discharged to outside through the discharge hole 12 arranged in the vicinity of the bottom of the lubrication space 4.

In such a case, the operator can check the liquid level of the lubricant 5 in the lubrication space 4 by observing the inside of the lubrication space 4 from outside through the window member 13b. Then when the liquid level of the lubricant 5 in the lubrication space 4 has become coincident with the mark 13c in the window member 13b, the discharge hole 12 is shut with the plug 12a.

As a result, the lubricant 5 in the lubrication space 4 can be discharged until the liquid level reaches the height position of the lower edge of the part attachment hole 14.

Furthermore, the lubricant 5 in the lubrication space 4 can be discharged through the discharge hole 12 arranged at a position closer to the floor. This provides an advantage in that, when the discharged lubricant 5 is recovered by allowing the discharged lubricant 5 to drop onto a tray or the like placed on the floor, the dropping distance of the lubricant 5 can be shortened and scattering of the lubricant 5 over the floor, etc., can be suppressed.

Here, the discharge hole 12 used to discharge the lubricant 5 in such a case is also used to discharge the lubricant 5 for maintenance operation other than the maintenance operation of the servomotor 2, such as replacing the lubricant 5 in the lubrication space 4 with a new lubricant 5. This provides an advantage in that the discharge position of the lubricant 5 does not have to change depending on the content of the maintenance operation.

In the case of the liquid level check hole 13' with the window member 13b fitted therein, the lubricant 5 is not discharged through the liquid level check hole 13; thus, the liquid level check hole 13' itself may be formed to be larger than the discharge hole 12 to improve the visibility of the liquid level inside.

Instead of having the window member 13b fitted in the liquid level check hole 13' having a circular cross-sectional shape, the liquid level check hole 13' may be formed to have a long hole shape extending in the vertical direction. This provides an advantage in that the change in liquid level inside the lubrication space 4 can be more reliably checked during discharge of the lubricant 5.

Although the mark 13c is provided in the window member 13b, the mark 13c may be omitted. Instead of checking the liquid level inside through a transparent window member 13b, a sensor may be used to detect that the liquid level inside has reached below the lower edge of the part attachment hole 14, and this may be alarmed through a lamp, a buzzer, or the like. In detecting the liquid level with a sensor, a valve that can be shut in response to the detection signal from the sensor may be provided in the discharge hole.

The invention claimed is:

1. A lubricant bath structure, comprising:
a casing configured to store a liquid lubricant,
wherein the casing is provided with a supply hole, a discharge hole, a part attachment hole, and a liquid level check hole that penetrate from inside to outside of the casing,
the supply hole enables injecting the lubricant into the casing,
the discharge hole enables discharging the lubricant in the casing,
the part attachment hole is opened/closed by detaching/attaching a mechanism part that is to be detachably attached to an outside surface of the casing, and
the liquid level check hole is arranged at a position coincident with or lower than a lower edge of the part attachment hole, but higher than the discharge hole, such that, during discharge of the lubricant, it can be determined that a liquid level of the lubricant has reached below the lower edge of the part attachment hole.

2. The lubricant bath structure according to claim 1, wherein the liquid level check hole is arranged at a height position of the lower edge of the part attachment hole.

3. The lubricant bath structure according to claim 1, wherein the liquid level check hole has a diameter smaller than the part attachment hole, and is closed by an openable/closable stopper.

4. The lubricant bath structure according to claim 1, further comprising:
a transparent window member that seals the liquid level check hole,
wherein the liquid level of the lubricant in the casing is observable from outside through the window member.

5. The lubricant bath structure according to claim 4, wherein the window member has an indicator that indicates a height position of the lower edge of the part attachment hole.

6. The lubricant bath structure according to claim 1, wherein
the casing includes a casing body having an opening, and a lid member attached to a such a position that, with respect to the casing body, the lid member closes the opening,
the supply hole, the discharge hole, the part attachment hole, and the liquid level check hole are formed in the lid member, and
an attachment position of the lid member with respect to the casing body can be changed by an angle about a specified axis.

7. A robot comprising:
at least one joint mechanism,
wherein the joint mechanism includes the lubricant bath structure according to claim 1.

8. The robot according to claim 7,
wherein the joint mechanism includes an arm member supported so as to be relatively rotatable about a specified axis with respect to the casing,
the mechanism part is a motor, and
a reducer mechanism that reduces rotations of a motor shaft of the motor and transmits the rotations to the arm member is housed in the casing.

\* \* \* \* \*